US006965996B2

United States Patent
Hirano et al.

(10) Patent No.: US 6,965,996 B2
(45) Date of Patent: Nov. 15, 2005

(54) METHOD FOR FACILITATING LEGITIMATE USE OF DIGITAL CONTENT

(75) Inventors: Hideyuki Hirano, Kawasaki (JP); Seigo Kotani, Kawasaki (JP); Shinji Hashimoto, Kawasaki (JP); Kazuhiko Muramoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 860 days.

(21) Appl. No.: 09/725,674

(22) Filed: Nov. 30, 2000

(65) Prior Publication Data

US 2001/0004736 A1 Jun. 21, 2001

(30) Foreign Application Priority Data

Dec. 16, 1999  (JP) ............................................ 11-357131

(51) Int. Cl.[7] ................................................ H04L 9/00
(52) U.S. Cl. ....................................... 713/176; 382/100
(58) Field of Search ............................... 713/176, 177, 713/178, 179; 382/232, 250, 100

(56) References Cited

U.S. PATENT DOCUMENTS 6,182,218 B1 * 1/2001 Saito ........................... 713/176
6,490,681 B1 * 12/2002 Kobayashi et al. .......... 713/171
6,707,927 B1 * 3/2004 Kita et al. .................... 382/100
2002/0002466 A1    1/2002 Kambayashi et al.

FOREIGN PATENT DOCUMENTS

JP       11-119651       4/1999
JP       11-283327      10/1999

* cited by examiner

*Primary Examiner*—Andrew Caldwell
*Assistant Examiner*—Minh Dieu Nguyen (57) ABSTRACT

Method of data operation facilitating utilization of legitimate users without violating the copyright and literary property of digital content. A part of digital content (11) is duplicated to create discrete data unit (43), and is encrypted with content key (45). Content key (45) and image-compositing information (42) are encrypted with secret key (47) to create authorization information (48). Content information (41) is visibly embedded in digital content (11). Authorization information-added data unit (50) in which authorization information (48) is embedded as invisible information and encrypted discrete data unit information (46) are composited into composite data (60), which is then distributed.

15 Claims, 10 Drawing Sheets

METHOD FOR FACILITATING LEGITIMATE USE OF DIGITAL CONTENT

BACKGROUND OF THE INVENTION

1. Technical Field

The present invention relates to a recording medium recording a program for a method of data management and a method of image creation, a transmission medium transmitting a program for a method of image creation, a recording medium recording a program for a method of image restoration, and a transmission medium transmitting a programs for a method of image restoration, and more particularly relates to a method of data management for distributing digital content with annex information visibly arranged, a recording medium recording a program for a method of image creation for using distributed image data in the method of data management, a transmission medium for transmitting the program, a recording medium recording a program for a method of image restoration for using distributed image data, and a transmission medium transmitting the program.

2. Description of Related Art

For software such as computer programs and electronic publications, computerized data are stored on magneto-optic disks (MO), DVD, floppy disks (FD), mini discs (MD), etc., and sold. These computerized data are easily duplicated, and illegal duplicates are frequently made. On this account, software vendors' and publishers' copyrights are notably encroached and profits notably hindered.

Computerized data including static images and moving images distributed via the Internet, CATV, etc. are also illegally duplicated, which spoils copyright holders' profits.

To protect computerized data referred to as "digital content" stored on recording media or distributed via a network, the digital content is encrypted using an encryption key, and the encrypted substantive data are distributed.

For example, consider that a user accesses a distributor of content from his/her personal computer and downloads digital content to the hard disk to use. Firstly, the user accesses a host computer to obtain a plug-in module for downloading. After that, an identification number of a hard disk drive being used, a CPU identification number of the computer being used, and other use-specific identification information are sent to the host computer.

On the content distributor end substantive data, in which digital content has been encrypted with a content key, and licensing data, in which the content key has been encrypted with user-specific identifying information, are sent to the user end.

The user stores the encrypted substantive data and the authorization information which are left encrypted on the hard disk. When the user uses the digital content, the user decrypts the authorization information using the identification information such as an identification number of the hard disk drive and obtains the content key. With the content key, the user decrypts the encrypted digital content to use.

In this case, an encryption key for coding digital content can be made to be common when right of digital content availability is granted to individual users, and the right of availability can be individually granted by coding a decryption key by using a user-specific information which differs depending on the user.

When data are distributed in the above manner, a data distributor needs to individually send encrypted digital content and authorization information which is a decryption key of encrypted digital content.

Meanwhile users need to individually store the encrypted digital content sent that has been sent in and their authorization information on a recording medium.

Therefore if authorization information is destroyed while it is being sent from a data distributor to a user, or is destroyed or lost on a user's recording media due to some accident, digital content cannot be used and a procedure for obtaining the authorization information must be performed again.

Further, in situations in which library apographs and art museum collections are by photographing or scanning imported as image data that is used by users, if the image data is completely encrypted, pinpointing the image data desired on the users' end before transacting authorization information is difficult.

Therefore it is desirable that part of the image can be checked by users and the image cannot be illegally diverted.

For this reason, it is conceivable that annex information such as copyright information is embedded in digital content and distributed as a visible digital watermark as shown in Japanese Laid-Open Pat. App. 1996-241403.

When annex information is embedded in digital content and distributed as a visible digital watermark, modulation data of color or brightness must be created for each pixel and be distributed with digital content with annex information to eliminate the annex information and restore the original digital content. Therefore there occur problems that transmission and receive of such data is time-consuming and large memory capacity for storing data is consumed.

SUMMARY OF THE INVENTION

The present invention provides a method of data management which facilitates use by legitimate users without violating copyright and literary property, a recording medium recording a program for a method of image creation to use distributed image data in this method, a transmission medium transmitting the program, a recording medium recording a program for a method of image restoration to use distributed image data, and a transmission medium transmitting the program.

A method of data management as determined in the present invention is for distributing digital content with annex information visibly arranged, and includes a step that a part of the above-mentioned digital content including a position where the above-mentioned annex information is visibly arranged is duplicated as a discrete data unit, and this discrete data unit is decrypted to create a decrypted discrete data unit, a step that image-compositing information concerning a position and size on the occasion when the above-mentioned annex information is arranged in the above-mentioned digital content, and authorization information including information of an encryption key into which the above-mentioned encrypted discrete data unit is encrypted are embedded in the above-mentioned digital content as an invisible information to create a authorization information-added data unit, a step that the above-mentioned annex information is visibly arranged on a position corresponding to a discrete data unit of the above-mentioned data part with the above-mentioned authorization information to create a data part with annex information, and a step that composite data composed of the above-mentioned encrypted discrete data unit and the above-mentioned data part with annex information is created and distributed.

Herein the annex information is embedded in the above-mentioned digital content as a visible digital watermark.

Annex information equivalent to annex information embedded in the above-mentioned digital content as a visible digital watermark can be configured so that it may be embedded in the above-mentioned discrete data unit as an invisible digital watermark and be encrypted to create an encrypted discrete data unit.

Furthermore, image-compositing information and authorization information can be configured so that they may be encrypted with a secret key and embedded in digital content as an invisible information, and the invisible information can be embedded in a part including a position where annex information of digital content is arranged. Herein the secret key can be at least any one of identification information of a user, identification information of devices mounted on a personal computer used by the user, identification information of CPUs mounted on the personal computer used by the user, identification information specific to a recording media storing the above-mentioned digital content, or user login information registered on the computer used by the user, be identification information common to plural users, and be selected from at least any one of identification information specific to a distributor of the above-mentioned digital content or identification information specific to an author of the above-mentioned digital content.

The method of data management can be configured so that it may comprise;

a step that a authorization information-added data unit and an encrypted discrete data unit are separated from distributed composite data;

a step that image-compositing information and authorization information are extracted from the separated authorization information-added data unit;

a step that a encryption key into which the above-mentioned discrete data unit is encrypted is restored by using the extracted authorization information;

a step that a discrete data unit is restored from the above-mentioned encrypted discrete data unit by using the restored encryption key; and a step that the restored discrete data unit is merged into image data of the above-mentioned authorization information-added data unit based on the above-mentioned image-compositing information.

Herein the method of data management can be configured so that invisible information embedded in a authorization information-added data unit may include the use counts that a user uses the above-mentioned digital content, and the above-mentioned invisible information is updated every time a user uses the above-mentioned digital content.

The method of data management can be also configured so that if the use counts exceed a predetermined value, the use by a user may be prohibited.

The method of data management can be configured so that image-compositing information and authorization information extracted from the above-mentioned authorization information-added data unit may be prohibited, and image data into which restored partial data is merged is prohibited to be saved in image data of the above-mentioned authorization information-added data unit.

The present invention provides a recording media recording a program for a method of image creation comprising;

a step that a part of digital content including a position where annex information is visibly arranged is duplicated as partial data;

image-compositing information concerning a position and size on the occasion when the above-mentioned annex information is arranged in the above-mentioned digital content and authorization information including information of the encryption key into which the above-mentioned encrypted partial data is encrypted are embedded in the above-mentioned digital content as invisible information to create a authorization information-added data unit;

a step that the above-mentioned annex information is visibly arranged on a position corresponding to a discrete data unit of the above-mentioned authorization information-added data unit to create a data part with annex information; and a step that a composite data composed of the above-mentioned encrypted partial data and the above-mentioned data part with annex information is created.

Herein a floppy disk, hard disk, a semiconductor memory, CD-ROM, DVD, or MO (magnet-optic disk), which is computer-recordable, is conceivable as a recording medium.

The present invention provides a transmission medium transmitting a program for a method of image creation comprising;

a step that a part of digital content including a position where annex information is visibly arranged is duplicated as partial data and the partial data is encrypted to create an encrypted partial data;

a step that image-compositing information concerning a position and size on the occasion when the above-mentioned annex-information is arranged on the above-mentioned digital content and authorization information including information of the encryption key into which the above-mentioned encrypted partial data is encrypted are embedded in the above-mentioned digital content as invisible information to create a authorization information-added data unit;

a step that the above-mentioned annex information is arranged on a position corresponding to a discrete data unit of the above-mentioned authorization information-added data unit to create a data part with annex information; and a step that a composite data composed of the above-mentioned encrypted partial data and the above-mentioned data part with annex information is created.

Herein a communication medium on a computer network system (LAN, Internet, or radio communication network) for transmitting and providing module information as a carrier wave as a fiber optic, or a radio circuit is included as a transmission medium.

The present invention provides a recording media recording a program for a method of data restoration comprising;

a step that a authorization information-added data unit and an encrypted partial data are separated from distributed composite data;

a step that image-compositing information and authorization information are extracted from the separated data part with annex information;

a step that the encryption key into which the above-mentioned encrypted partial data is encrypted is restored by using the extracted authorization information;

a step that the above-mentioned encrypted partial data is restored to a discrete data unit by using the restored encryption key; and a step that the restored discrete data unit is merged into image data of the above-mentioned authorization information-added data unit based on the above-mentioned image-compositing information.

Furthermore the present invention provides a transmission medium transmitting a program for a method of image restoration comprising;

a step that a authorization information-added data unit and an encrypted discrete data unit are separated from the distributed composite data;

a step that image-compositing information and authorization information are extracted from the separated authorization information-added data unit;

a step that the encryption key into which the above-mentioned encrypted discrete data unit is encrypted is restored by using the extracted authorization information;

a step that the above-mentioned encrypted discrete data unit is restored to a discrete data unit by using the extracted encryption key; and a step that the restored discrete data unit is merged into image data of the above-mentioned authorization information-added data unit based on the above-mentioned image-compositing information.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

Figure 1:
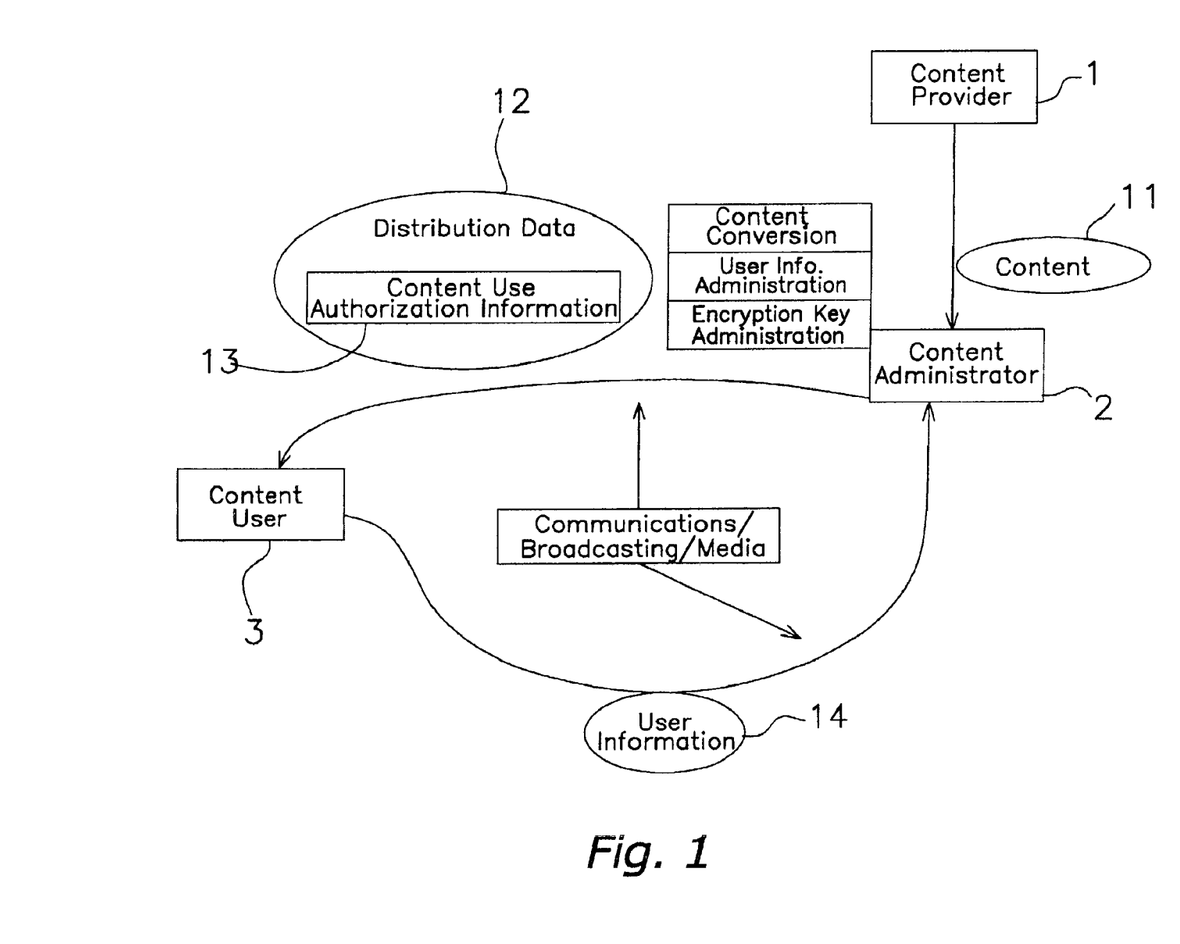
FIG. 1 is a configurational outline diagram for the present invention.

FIG. 1 is a configurational outline for the present invention.

A content provider 1 is a digital content copyright holder or literary property holder, and provides digital content 11 to a content administrator 2 for handling.

The content administrator 2 administrates the digital content 11 provided by the content provider 1, an encryption key used when the digital content 11 is handled, and user information on users who use the digital content 11.

A content user 3 sends user information 14 to the content administrator if he/she would like to use digital content administrated by the content administrator 2.

The content administrator 2 administrates the user information 14 sent from a content user 3, creates content authorization information 13, converts the content authorization information into distribution data 12 including the digital content 11, and sends it to the content user 3.

The content administrator 2 duplicates part of the digital content as a discrete data unit and encrypts it. The content administrator 2 embeds annex information such as copyright information as a visible digital watermark in a position in the digital content 11 corresponding to the discrete data unit. The content administrator 2 encrypts image-compositing information showing position and size of the discrete data unit and information on the encryption key used when the discrete data unit is encrypted to create authorization information 13. The content administrator 2 embeds the authorization information 13 in the digital content 11 as an invisible digital watermark and merges the digital watermark and the encrypted discrete data unit into the distribution data 12.

Herein the content provider and content administrator 2 may be the same.

Content Administrator

Figure 2:
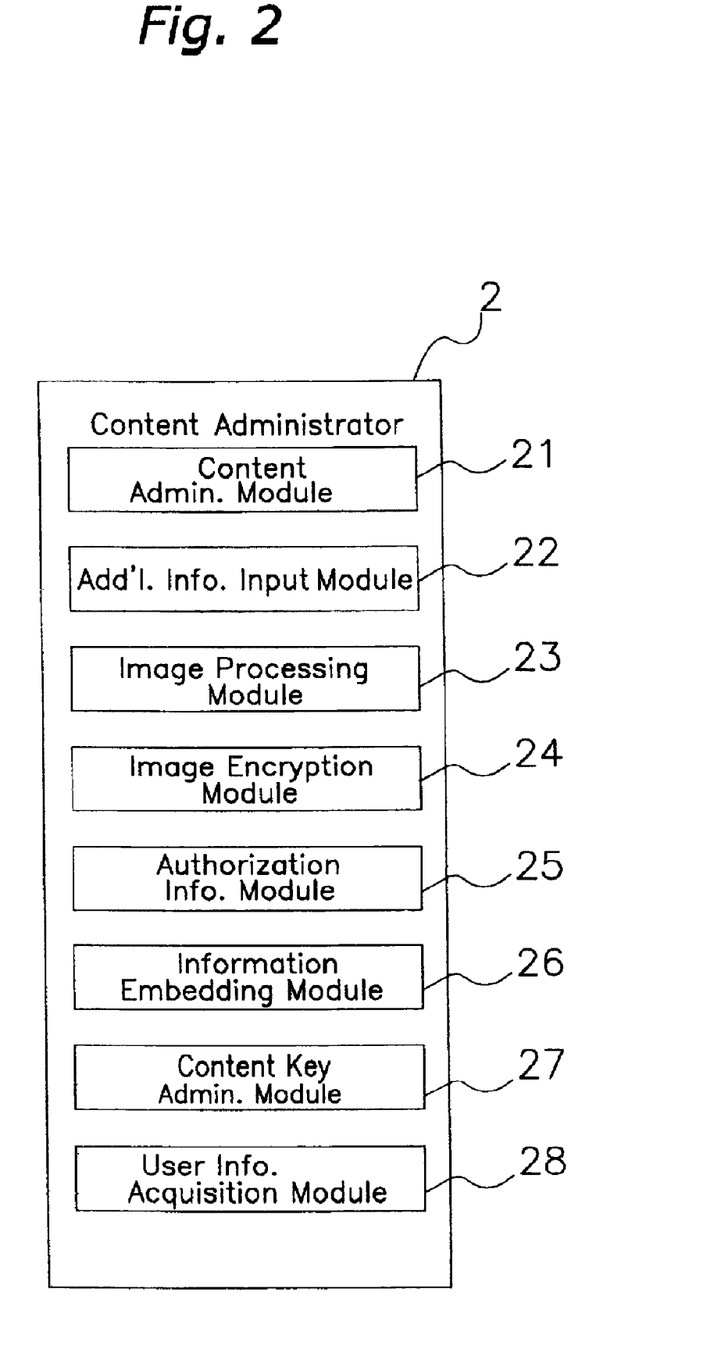
FIG. 2 is a configurational outline diagram for the content administrator side.

FIG. 2 is a functional block diagram showing the overall configuration of the content administrator 2.

The content administrator 2 is composed of a host computer and server applications, and includes: a content administration module 21; a annex information input module 22 for input of annex information such as copyright information, and for determining the position where the annex information is embedded; an image processing module 23 functioning to duplicate a portion of the digital content, and to visibly embed annex information in an original image; an image encrypting module 24 for encrypting with a content key a discrete data unit duplicated from the digital content; an authorization information creating module 25 for encrypting image-compositing information indicating information concerning the content key, and position and size of the discrete data unit, in order to create authorization information, an information embedding module 26 embedding the information of the content key and the image-compositing information in digital content as invisible information, a content key administrating module 27 administrating a content key for encrypting the discrete data unit; and a user information acquisition module 28 for acquiring and administrating user information for the content user 3.

Content User

Figure 3:
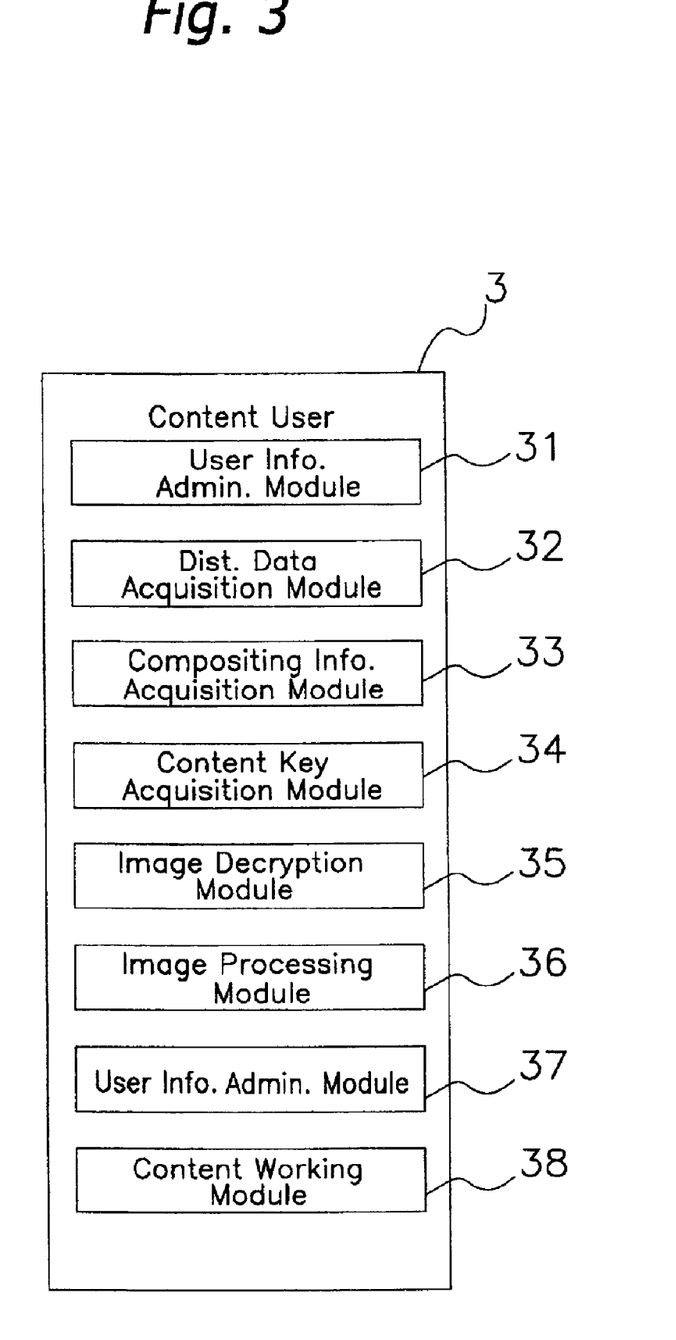
FIG. 3 is a configurational outline diagram for the content administrator side.

FIG. 3 is a functional block diagram showing the overall configuration of a content user 3.

The content users 3 are made up of terminals such as personal computers and workstations, and an application for using content. The content user 3 is furnished with: a user information administrating module 31 for administrating user-specific identification information such as the identification number of a hard disk drive in use and the identification number computer's on-board CPU; a distribution data acquisition module 32 for acquiring distribution data from the content administrator 2; an image-compositing information acquisition module 33 for extracting image-compositing information from the distribution data; a content key acquisition module 34 for acquiring information for content keys from the distribution data; an image decrypting module 35 for decrypting encrypted a discrete data unit among the distribution data; an image processing module 36 for compositing a decrypted discrete data unit with digital content; a user information managing module 37 for managing user information and availability information based on availability of content; and a content working module 38 for working digital content.

Content Distribution

Figure 4:
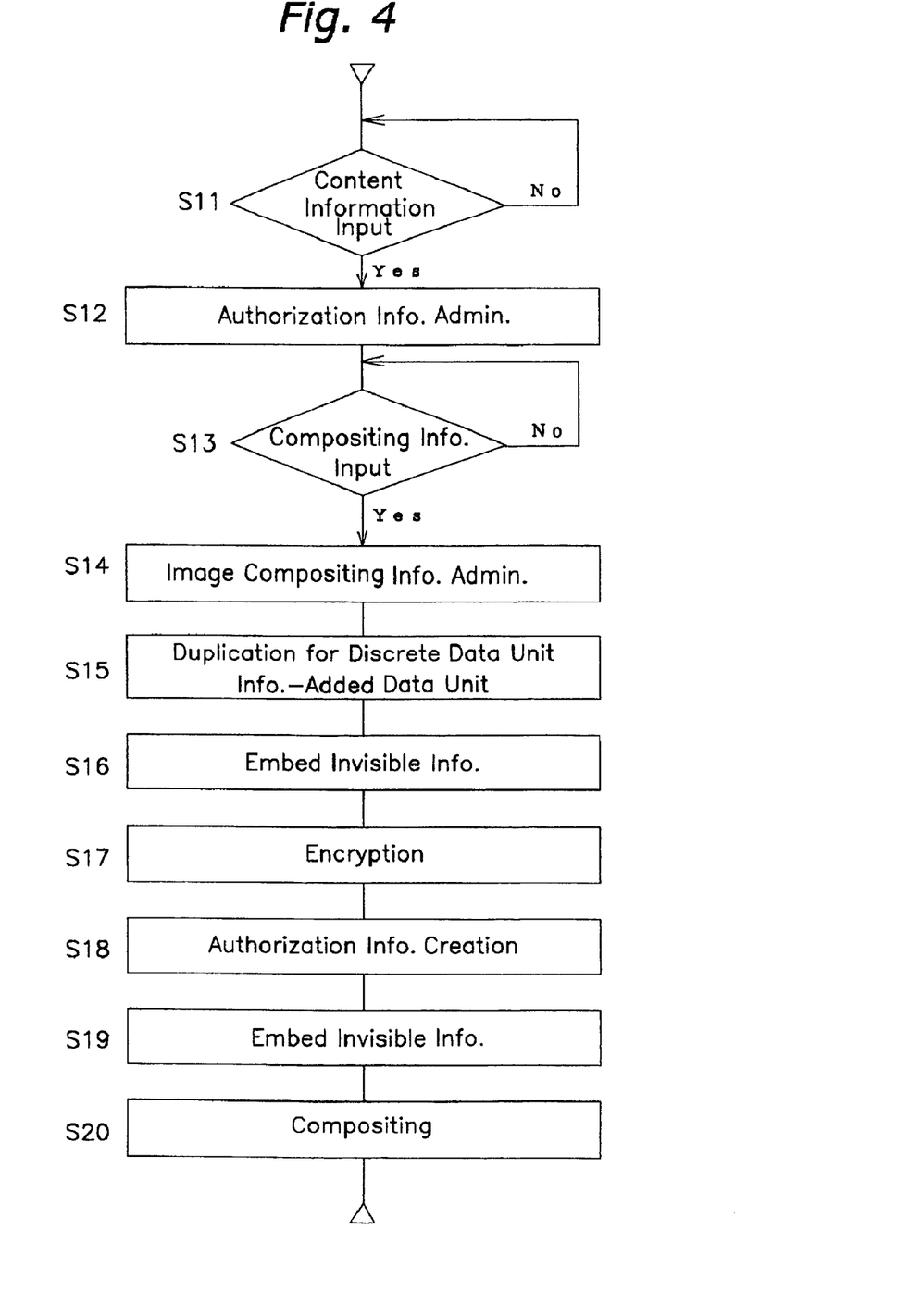
FIG. 4 is a flowchart of when distribution data is created.
Figure 5:
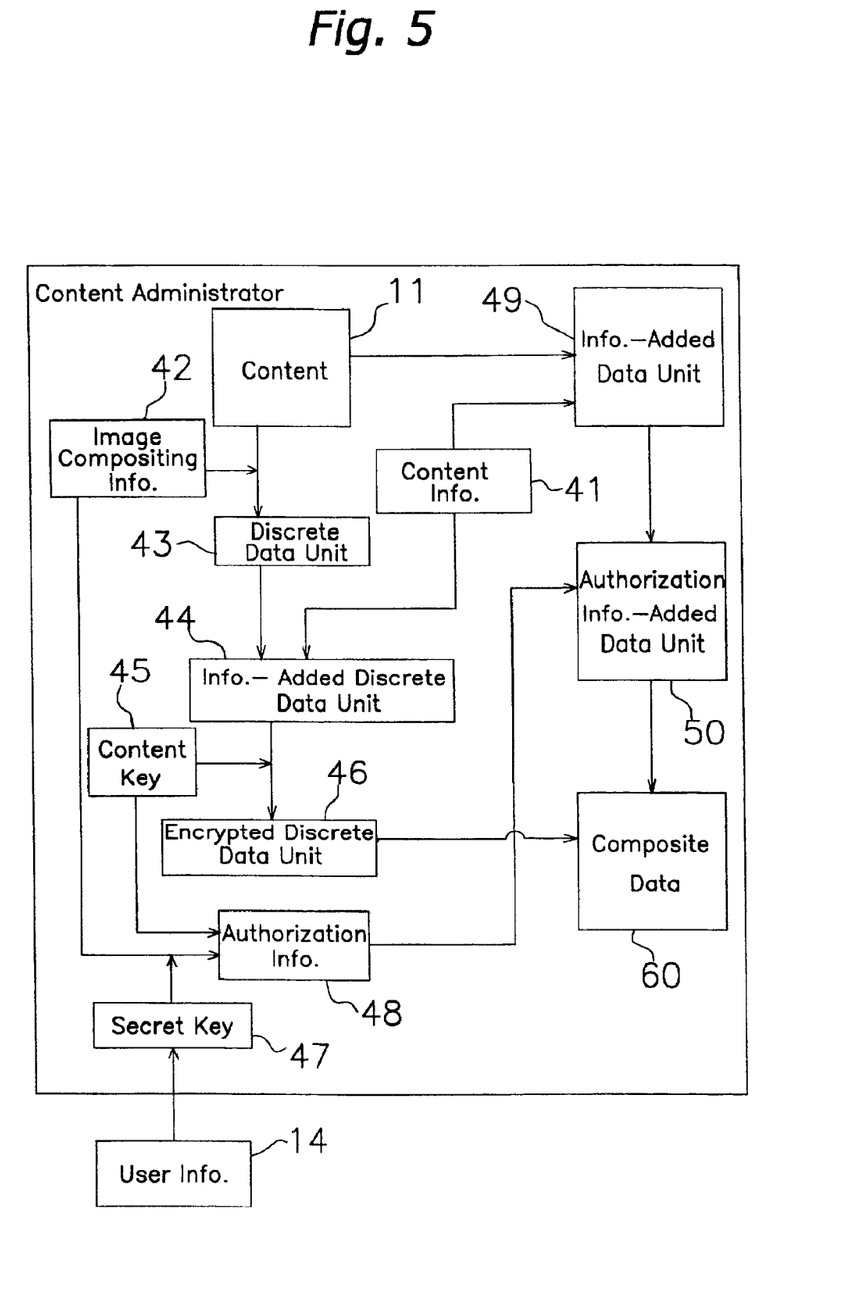
FIG. 5 is a diagram in principle of distribution data being created.

The following describes, based on FIG. 4 and FIG. 5, operations performed by the content administrator 2 before digital content is distributed.

In step S11, the content administrator 2 determines whether content information 41 concerning digital content to be distributed is input or not. The content information 41 is information concerning a copyright holder of the digital content 11 and information of an administrator distributing the digital content 11, and for being embedded in the digital content as a visible digital watermark. The content information can be obtained by input by an operator with an input device such as a keyboard, or extraction of corresponding information from a database file administrating the digital content.

In step S11, if the content administrator 2 determines that the content information has been input, step 12 ensues. In step 12, the input content information 41 is stored in a storing device and administrated.

In step S13, the content administrator 2 determines whether image-compositing information 42 concerning position where the content information 41 is embedded as a visible digital watermark, and concerning size has been input or not.

For example, operator input of the coordinates of an initial point P(x, y) and pixel numbers G(x) and G(y) with an input device such as a keyboard is regarded as input of image-compositing information 42 and step S14 ensues. The existence of image-compositing information 42 such as the coordinates of an initial point P(x, y) and pixel numbers G(x) and G(y) set by an application, also regarded as the input of image-compositing information 42, and step S14 ensues. In step S14, the input image-compositing information 42 is stored in a storing device and administrated.

In step S15, the content administrator 2 duplicates a part of the digital content 11 based on the image-compositing information 42 to create a discrete data unit 43. At the same time, the content administrator 2 embeds the content information 41 in a position corresponding to the discrete data unit 43 in the digital content. Methods involving color modulation or methods involving brightness modulation are available as ways of visibly embedding the content information 41.

In step S16, the content administrator 2 embeds the content information 41 in the discrete data unit 43 as an invisible digital watermark to create an information-added discrete data unit 44. Information as an invisible digital watermark can be added by inserting the content information 41 in a specific frequency band of the discrete data unit or thinning out a portion of the data and inserting the content information 41 there.

In step S17, the content administrator 2 encrypts the information-added discrete data unit 44 with a content key 45 to create an encrypted discrete data unit. The content administrator 2 administrates the content key 45, and the same key may perform encryption and decryption.

In step S18, the content administrator 2 encrypts the image-compositing information 42 and the content key 45 with a secret key 47 to create authorization information 48. The secret key 47 is an encryption key created based on user information sent from the content user 3. The user information 14 is previously sent from the content user 3, and at least one of: user identification information such as user ID or password; identification information for devices loaded on the user-operated computer; identification information for the on-board CPU in the user-operated computer; identification information specific to a recording medium storing the digital content; or user login information registered in the user-operated computer, may be used as user information 14.

In step S19, the content administrator 2 embeds the authorization information 48 as an invisible digital watermark in a position in information-added data unit 49 other than that which corresponds to the discrete data unit 43, which creates an authorization information-added data unit 50.

In step S20, the content administrator 2 composites the authorization information-added data unit 50 and the encrypted discrete data unit 46 into composite data 60. The composite data 60 created in this way is distributed through an online network such as the Internet or recording media such as CD-ROMs and DVDs, in response to requests from content users 3.

Using Content

Figure 6:
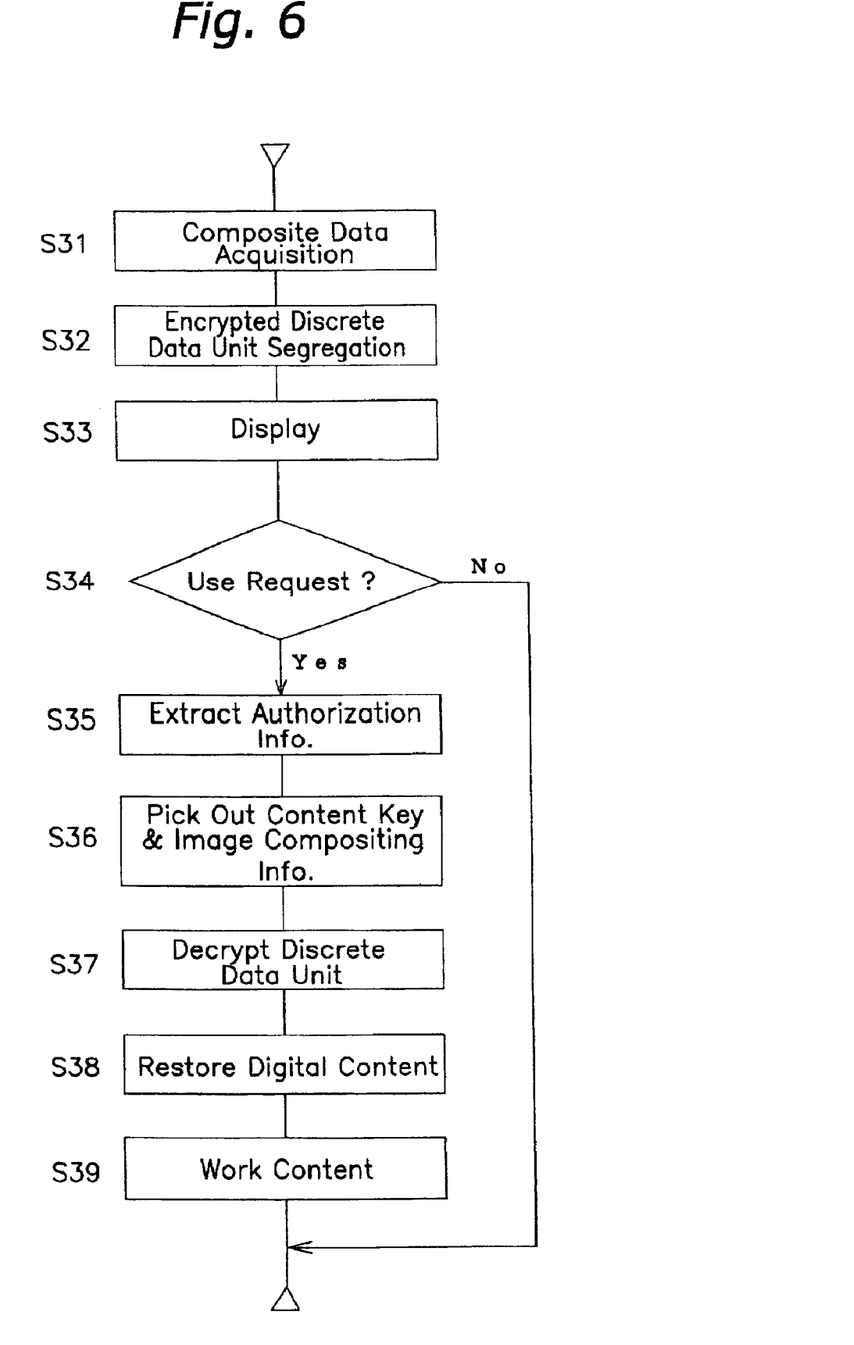
FIG. 6 is a flowchart of when content is utilized.
Figure 7:
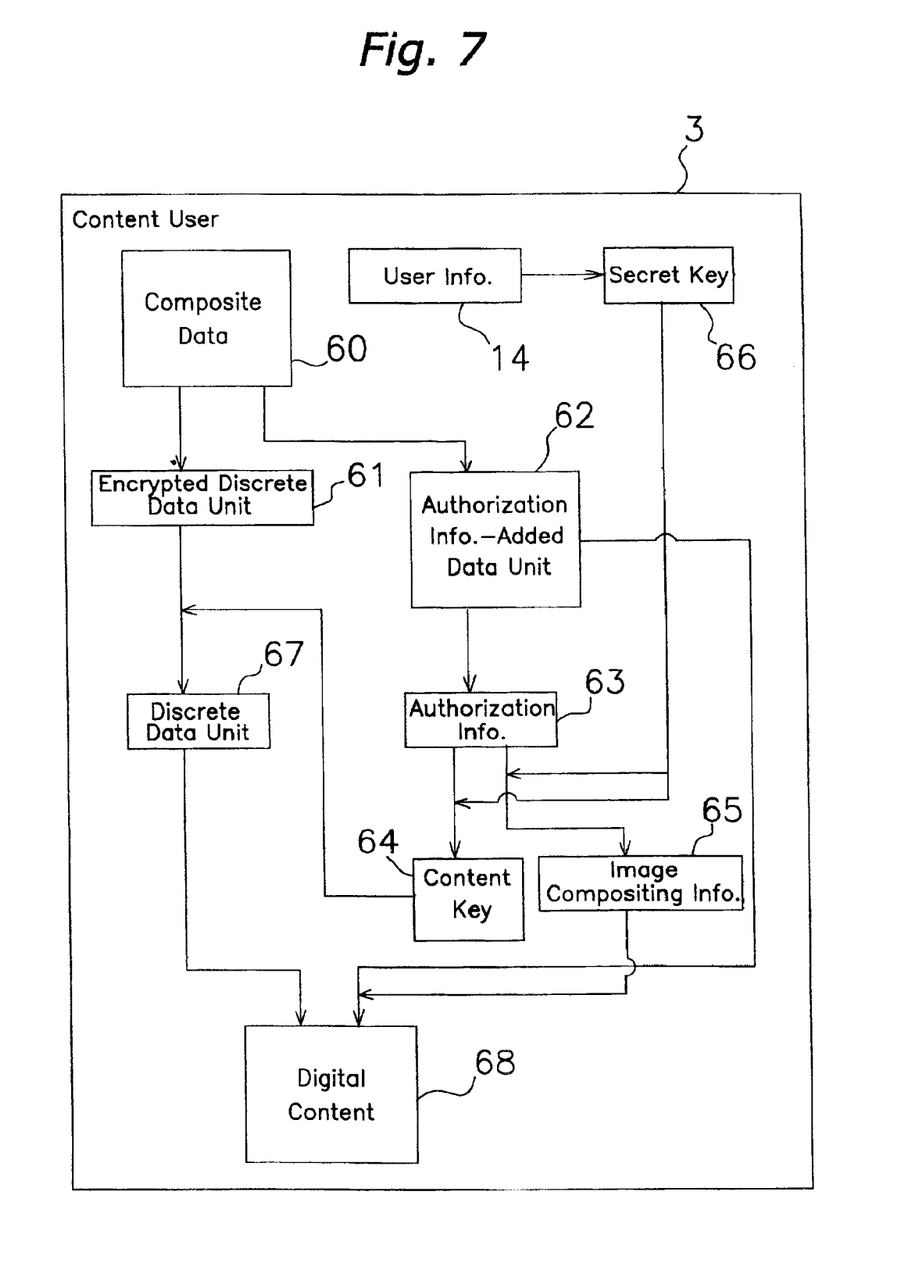
FIG. 7 is a diagram in principle of content being utilized.

The following describes based on FIG. 6 and FIG. 7 operations when the content user 3 uses the distributed digital content.

In step S31, composite data 60 is acquired from the content administrator 2. Herein, it is assumed that the content user 3 previously accesses the content administrator 2 and requests use of digital content administrated by the content administrator 2, sending user-specific information to the content administrator 2. The composite data 60 can be obtained by either downloading it via any type of network, or by the content administrator 2 distribution of recording media on which it is recorded. The acquired composite data 60 is stored on the hard disk used by the content user 3, or on another recording medium.

In step S32, an encrypted data unit 61 and an authorization information-added data unit 62 are segregated. Herein, in the authorization information-added data unit 62, authorization information is embedded as an invisible watermark, and content information indicating copyright information and the like is embedded as visible digital watermark. In step S33, the content user 3 displays the authorization information-added data unit 62. The authorization information-added data unit 62 that is displayed is visibly embedded with content information indicating copyright information and the like in the original digital content, and is configured in a position other than where the content information is embedded, so that the original digital content may be confirmed.

In step S34, whether or not the content user 3 has made a use request is determined. If on the authorization information-added data unit 62 display the content user 3 has made an instruction to the effect that this is to be used, step S35 ensues.

In step S35, the content user 3 extracts authorization information from the authorization information-added data unit 62. The authorization information 63 can be extracted by performing frequency analysis or image analysis.

In step S36, the content user decrypts the authorization information 63 to pick out a content key 64 and image-compositing information 65. The authorization information 63 is encrypted with the secret key 47 based on the user information 14. On this account, the content user 3 creates a decryption key 66 corresponding to the secret key 47 based on such user information 14 as: user identification information such as user ID or password; identification information for devices loaded on the user-operated computer; identification information for the on-board CPU in the user-operated computer; identification information specific to a recording medium storing the digital content; or user login information registered in the user-operated computer. Then decrypting the authorization information 63 utilizing the decryption key 66 enables the content key 64 and the image-compositing information 65 to be picked out.

In step S37, decrypting the encrypted discrete data unit 61 with the content key 64 that has been taken out restores the discrete data unit 67.

In step S38, based on information relating to position and size of the discrete data unit 67 included in the image-compositing information 65, the content user 3 restores the original digital content 68 by replacing data in a predetermined position in the authorization information-added data unit 62 with the discrete data unit 67.

In step S39, the content user 3 works the content by displaying the restored digital content 63 on the display, for example. Since content information such as copyright information is embedded as an invisible watermark in the replaced discrete data unit 67, the restored digital content 68 is such that content is embedded as invisible information, and the digital content 63 to be displayed includes content information as an invisible digital watermark.

Authorization Information Structure

Figure 8:
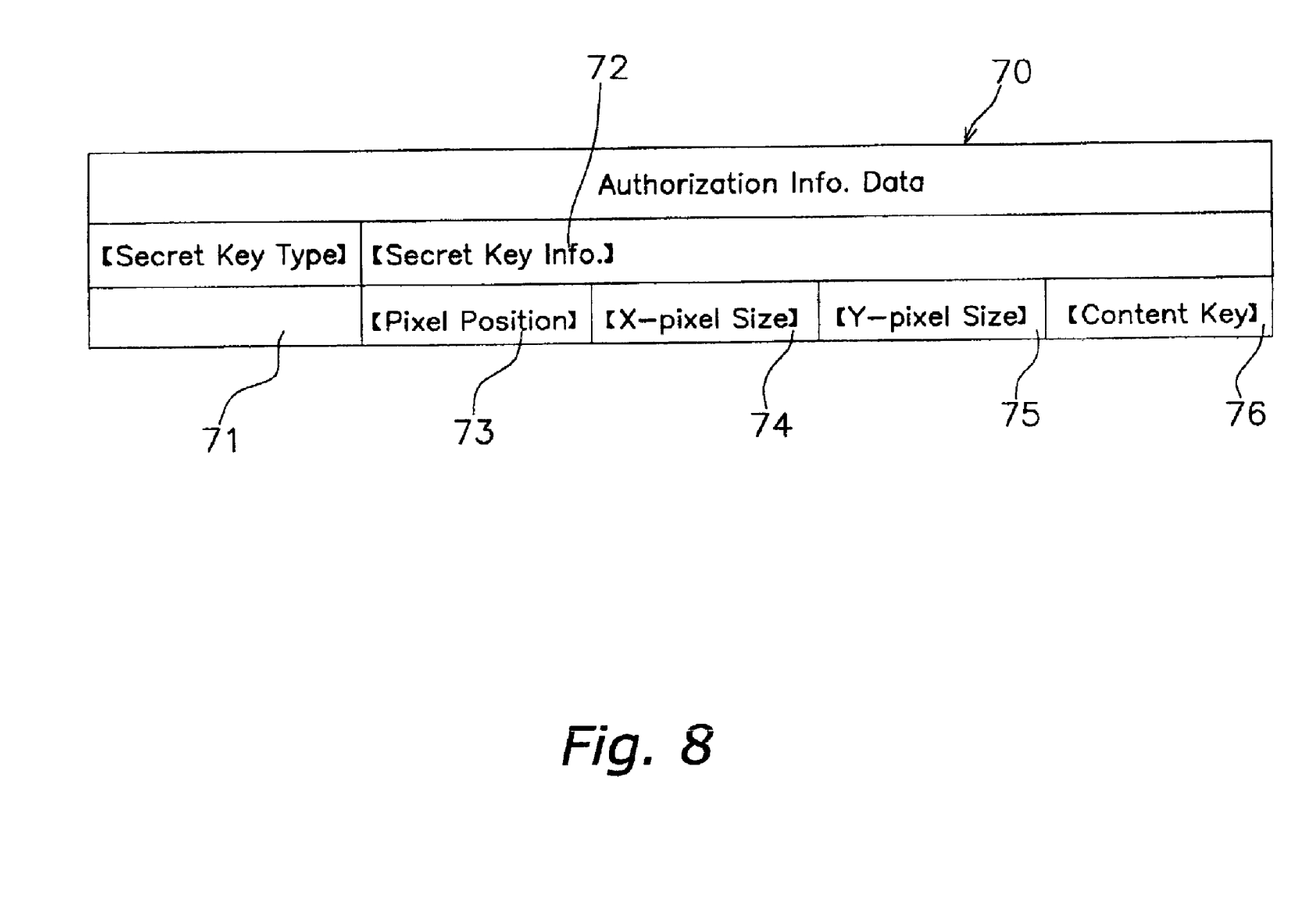
FIG. 8 is an explanatory diagram illustrating an example of authorization information structure.

FIG. 8 shows the structure of authorization information embedded in the digital content 11 as an invisible digital watermark.

Authorization information 70 is composed of a secret key-type area 71 in which the type of the secret key used for encryption is stored, and secret key information area 72 in which information encrypted with the secret key is stored.

The secret key type stored in the secret key-type area 71 indicates what type of information from the user information is used as the secret key. For example, if the storage-medium ID for a magneto-optic disk (MO) on which data are stored by the user is a secret key, the value to be stored in the secret key-type area 71 is set to "0" in advance. If a password set by the user is the secret key, the value to be stored in the secret key-type area 71 is set to "1" in advance.

The secret key information area 72 is composed of pixel position area 73, X-pixel size area 74, Y-pixel size area 75, and content key area 76. The image position area 73 is for storing on initial point P(x, y) when duplicating the discrete data unit 43. For example, this initial point P(x, y) indicates the left top corner point, and is input when the content administrator 2 creates distribution data.

In the X-pixel size area 74 and Y-pixel size area 75, x-direction pixel number G(x) and y-direction pixel number G(y) for the discrete data unit 43 are stored respectively. The x-direction pixel and y-direction pixel numbers G(x) and G(y) are input when the content administrator 2 creates distribution data, as is the case with the initial point P(x, y).

In the content key area 76, the content key 45 administrated by the content administrator 2 is stored. Data stored in the pixel position area 73 of the secret key information area 72, the X-pixel size area 74, the Y-pixel size area 75, and the content key area 76 are encrypted with a secret key identified by data in the secret key-type area.

Figure 9:
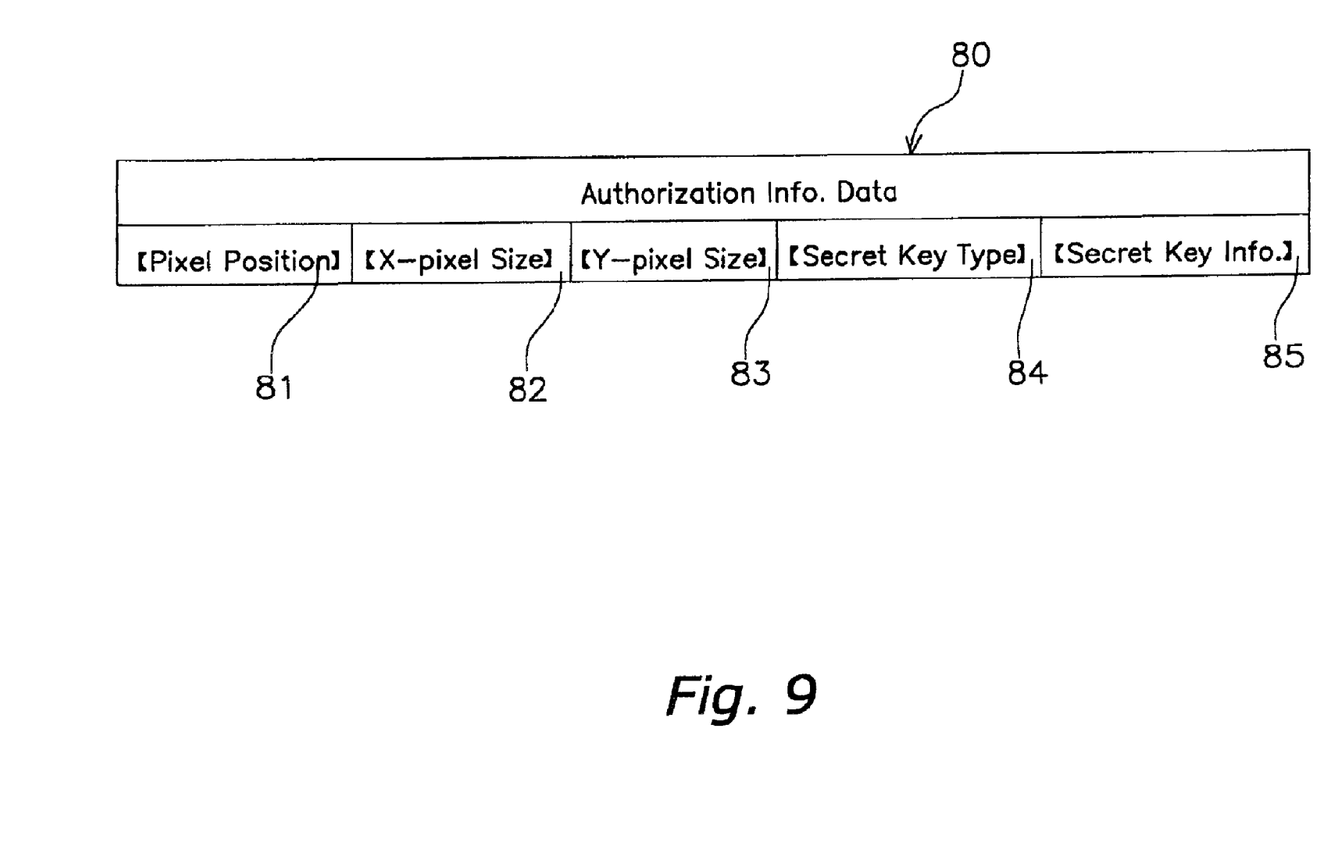
FIG. 9 is an explanatory diagram illustrating another example of authorization information structure.

The authorization information embedded in the digital content 11 as an invisible digital watermark can be structured as shown in FIG. 9.

In this case, authorization information data 80 is composed of pixel position area 81, X-pixel size area 82, Y-pixel size area 83, secret key-type area 84, and secret area information area 85. The pixel position area 81, X-pixel size area 82, and Y-pixel size area 83 respectively store the initial point P(x, y) when the discrete data unit 43 is duplicated, the x-direction pixel number G(x), and the y-direction pixel number G(y). These data stored in pixel position area 81, X-pixel size area 82, and Y-pixel size area 83 are input when the content administrator 2 creates distribution data as described above, and stored without encryption.

The secret key-type area 84 stores secret key type information indicating what type of information from the user information 14 is used as a secret key. For example, if the storage-medium ID of a magneto-optic disk (MO) on which data are stored by the user is a secret key, the value to be stored in the secret key-type area 71 is set to "0" in advance. If a password set by the user is the secret key, the value to be stored in the secret key-type area 71 is set to "1."

The secret key information area 85 stores information for the content key 45 encrypted with the secret key 47.

Access Restriction Method

If the decrypted content key 64, the discrete data unit 67 decrypted with the content key 64, and the restored digital content 68 are permitted to be saved in a memory or a recording medium in the process of distribution data being restored by the content user 3, there is the possibility that data is illegally distributed using the saved data. A method of access restriction to prevent this will be explained based on FIG. 10.

Figure 10:
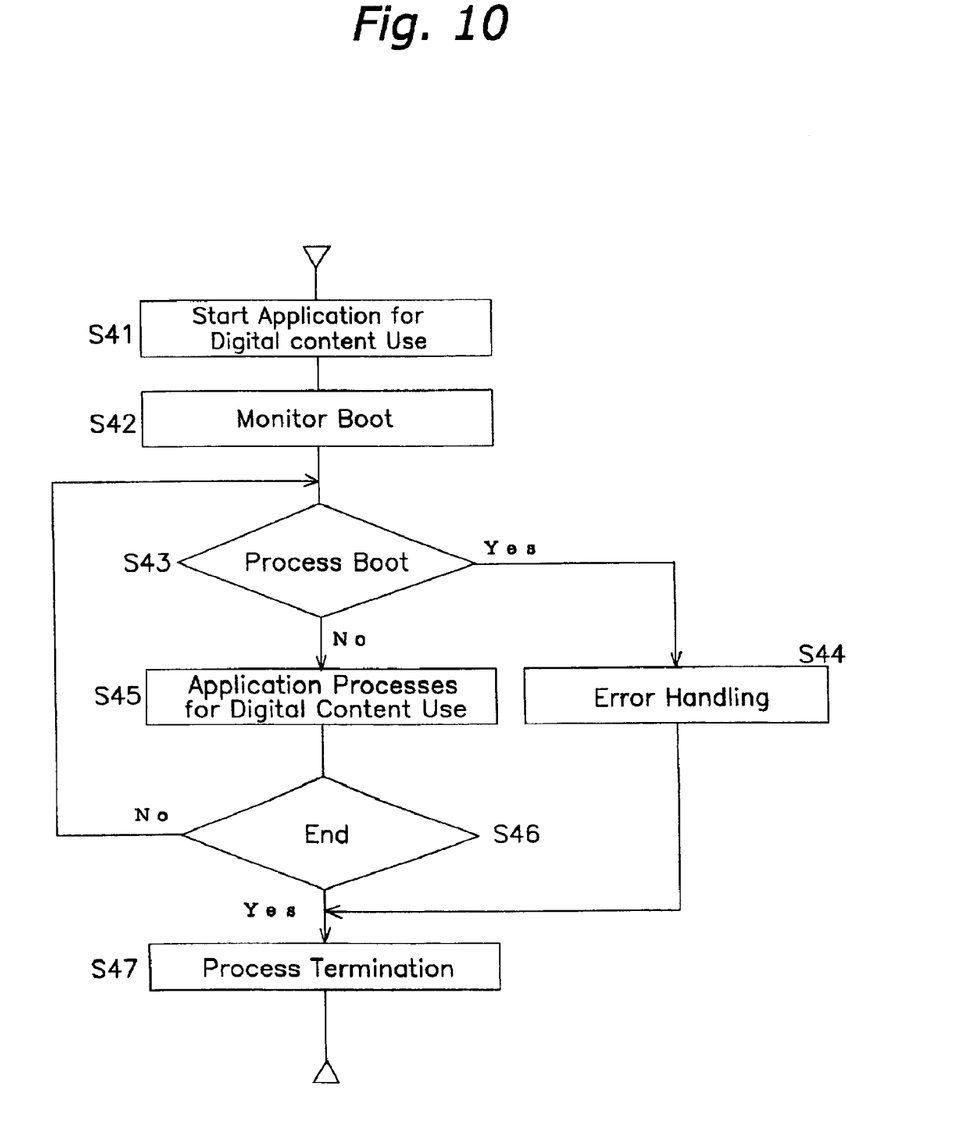
FIG. 10 is a flowchart showing an example of an access control method.

The application by which the content user 3 uses the distribution data has a monitoring function and activates a monitoring function program in step S41 at boot-up of the content utilization program.

This monitoring function program monitors for illegal programs ("memory hook" command: an Application Programming Interface) that function to snatch data in transit among the plurality of libraries that are components of the content utilization program. If the monitoring function program detects the occurrence of a memory hook command, program utilization is restricted.

In step S43, the monitoring function program determines whether or not a process by a memory hook-related command is started. If the monitoring function program determines that a process executing a memory hook-related command is started, step S44 ensues; otherwise step S4 ensues.

In step S44, the monitoring function program executes error handling. In error handling, the monitoring function program displays an error display showing that an illegal program based on a memory hook command is started and step S47 ensues.

In step 45, the monitoring function program executes operations of an application for utilizing the digital content. In step S46, the monitoring function program determines whether or not to end the application. If the user has instructed termination, step S47 ensues.

In step S47, the monitoring function program terminates the application for utilizing the digital content.

By this means the program restricts data written in the memory from being snatched while the program is running, and thus prevents the content key 64 and the digital content 68 obtained from the distribution data from being saved illegally.

OTHER EMBODIMENTS

A completely different image can be composited in a position corresponding the discrete data unit 43 of the digital content 11 to composite the data part with annex information 49. In this case, an image to be composited may include the content information 4, and an image not including the digital content 41 can be composited.

After the content information 41 is embedded in a position corresponding to the discrete data unit 43 of the digital content 11 as a visible digital watermark, the encrypted authorization information 48 can be embedded as an invisible digital watermark to create the authorization information-added data unit 50.

The decryption key 66 for decrypting the authorization information 63 can be common to the encryption key 47 used when the encrypted authorization information 48 is created.

The secret key 47 used when the encrypted authorization information 48 can be used as a secret key, and the decryption key 66 previously provided for the content user 2 by content administrator 2 can be used as a public key.

Use count of the number of times the content user 3 has used digital content can be provided as an invisible digital watermark embedded in the digital content 68. In this case, the use count information with the authorization information 63 embedded in the authorization information-added data unit 62 as an invisible digital watermark can be embedded as a digital watermark to update the invisible watermark every time the content user 3 uses the digital content.

When the content user 3 gives an instruction with the intention of using digital content, utilization of digital content can be made to be restricted if the use count exceeds a predetermined value.

It is also possible to rewrite the authorization information embedded as an invisible digital watermark to restrict the digital content from being used thereafter if the use count exceeds a predetermined value.

A recording medium on which a program by the present invention as above described is recorded is included in the present invention. Herein computer-readable floppy disks, hard disks, semiconductor memory, CD-ROMs, DVDs and MOs (magneto-optical disks) are conceivable as recording media.

A transmission medium transmitting a program by the present invention as above-described is included in the present invention. "Transmission media" herein include communications media (fiber optics, radio circuitry) on a computer network (LAN, the Internet, or radio communications network) system for supplying program information by propagation as a carrier wave.

According to the present invention, annex information is visibly arranged in digital content, which is embedded with authorization information and image-compositing information and distributed with an encrypted discrete data unit. The discrete data unit includes the position where the annex information is arranged. The authorization information is embedded as invisible information including encryption key information for encrypting the discrete data unit. Therefore, delivering by a separate route a decryption key for decrypting the encrypted discrete data unit is unnecessary. Content users can readily check an overview of the digital content, and meanwhile legitimate users can restore the original digital content for use from the composite data that has been distributed.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A data management method for distributing digital content in which annex information is visibly arranged, the data management method comprising:

a step of duplicating as a discrete data unit a part of said digital content including a position where said annex information is visibly arranged, and encrypting the discrete data unit to create an encrypted discrete data unit;

a step of embedding within said digital content as invisible information image-compositing information, relating to position and size for arranging said annex information in said digital content, and authorization information, including encryption key information by which said discrete data unit is encrypted, to create an authorization information-added data unit;

a step of visibly arranging said annex information in a position corresponding to the discrete data unit for said authorization information-added data unit, to create an annex information-added data unit; and a step of creating and distributing composite data composited from said encrypted discrete data unit and said annex information-added data unit.

2. The data management method set forth in claim 1, wherein said annex information is embedded in said digital content as a visible digital watermark.

3. The data management method set forth in claim 2, wherein annex information equivalent to annex information embedded in said digital content as a visible digital watermark is embedded in said discrete data unit as an invisible digital watermark and is encrypted to create an encrypted discrete data unit.

4. The data management method set forth in claim 1, wherein said image-compositing information and authorization information are encrypted with a secret key and embedded in said digital content as invisible information.

5. The data management method set forth in claim 4, wherein said image-compositing information and authorization information are encrypted with a secret key, and embedded as an invisible digital watermark in a portion of said digital content including the position where said annex information in said digital content is visibly arranged.

6. The data management method set forth in claim 4, wherein said secret key is at least one selected from among: user identification information, identification information for on-board devices in users' in-use computers, identification information for on-board CPUs in users' in-use computers, identification information specific to recording media storing said digital content, and user login information registered in users' in-use computers.

7. The data management method set forth in claim 4, wherein said secret key is identification information common to a plurality of users.

8. The data management method set forth in claim 4, wherein said secret key is at least one selected from among identification information specific to distributors of said digital content, and identification information specific to copyright holders of said digital content.

9. The data management method set forth in claim 1, further comprising:

a step of separating the authorization information-added data unit and the encrypted discrete data unit from the distributed composite data;

a step of extracting the image-compositing information and the authorization information from the separated authorization information-added data unit;

a step of using the extracted authorization information to restore the encryption key by which said encrypted discrete data unit is encrypted;

a step of using the restored encryption key to restore said encrypted discrete data unit into the discrete data unit; and a step of compositing, based on said image-compositing information, the restored discrete data unit into image data for said authorization information-added data unit.

10. The data management method set forth in claim 9, wherein invisible information embedded in said authorization information-added data unit includes use count information on times users use said digital content, and said invisible information is overwritten every time a user uses said digital content.

11. The data management method set forth in claim 10, wherein if the use count information included in said invisible information exceeds a predetermined value, users' use is restricted.

12. The data management method set forth in claim 9, configured to restrict saving of the image-compositing information and authorization information extracted from said authorization information-added data unit.

13. The data management method set forth in claim 9, configured to restrict saving of the image data in which the restored discrete data unit is composited into the image data for said authorization information-added data unit.

14. A recording medium on which is recorded a program for an image-generating method comprising:
   a step of duplicating as a discrete data unit a part of digital content including a position where annex information is visibly arranged, and encrypting the discrete data unit to create an encrypted discrete data unit;
   a step of embedding within said digital content as invisible information image-compositing information, relating to position and size for arranging said annex information in said digital content, and authorization information, including encryption key information by which said discrete data unit is encrypted, to create an authorization information-added data unit;
   a step of visibly arranging said annex information in a position corresponding to the discrete data unit for said authorization information-added data unit, to create an annex information-added data unit; and
   a step of creating composite data composited from said encrypted discrete data unit and said annex information-added data unit.

15. A recording medium on which is recorded a program for an image-restoration method comprising:
   a step of separating an authorization information-added data unit and an encrypted discrete data unit from distributed composite data;
   a step of extracting image-compositing information and authorization information from the separated authorization information-added data unit;
   a step of using the extracted authorization information to restore the encryption key by which said encrypted discrete data unit is encrypted;
   a step of using the restored encryption key to restore said encrypted discrete data unit into the discrete data unit; and
   a step of compositing, based on said image-compositing information, the restored discrete data unit into image data for said authorization information-added data unit.

* * * * *

UNITED STATES PATENT AND TRADEMARK OFFICE
CERTIFICATE OF CORRECTION

PATENT NO. : 6,965,996 B2  
APPLICATION NO. : 09/725674  
DATED : November 15, 2005  
INVENTOR(S) : Hideyuki Hirano et al.

It is certified that error appears in the above-identified patent and that said Letters Patent is hereby corrected as shown below:

Column 13, Line 4, delete "users" and insert -- users' -- therefor.

Signed and Sealed this

Fifth Day of September, 2006

JON W. DUDAS  
*Director of the United States Patent and Trademark Office*